United States Patent [19]
Wegmann et al.

[11] Patent Number: 5,915,861
[45] Date of Patent: Jun. 29, 1999

[54] METHOD AND APPARATUS FOR DRIVING A STEPPING MOTOR USING DIGITAL PULSE TRAINS SIMULATING SINE AND COSINE WAVES

[75] Inventors: Thomas Wegmann; Jean-Luc Passello, both of Yverdon-les-Bains, Switzerland

[73] Assignee: Olivetti-Canon Industriale S.p.A., Italy

[21] Appl. No.: 08/946,169

[22] Filed: Oct. 7, 1997

[30] Foreign Application Priority Data

Oct. 15, 1996 [CH] Switzerland ............................ 2519/96

[51] Int. Cl.⁶ .............................. B41J 19/30; H02P 8/00
[52] U.S. Cl. ......................... 400/322; 400/903; 318/685; 318/696
[58] Field of Search ..................................... 400/279, 320, 400/322, 323, 903; 318/685, 696

[56] References Cited

U.S. PATENT DOCUMENTS

| | | | |
|---|---|---|---|
| 4,631,657 | 12/1986 | Hill et al. ................................ | 318/685 |
| 4,706,008 | 11/1987 | Cronch et al. ........................... | 400/903 |
| 4,707,649 | 11/1987 | Kanemura ................................ | 400/903 |
| 4,928,050 | 5/1990 | Torisawa et al. ........................ | 400/903 |
| 5,547,295 | 8/1996 | Kanemitso ............................... | 400/903 |

*Primary Examiner*—Eugene Eickholt
*Attorney, Agent, or Firm*—Banner & Witcoff, Ltd.

[57] ABSTRACT

The method for driving a stepping motor for printers comprises the generation of first pulses (16A,16B) at n levels recorded in registers and representing a simulation of sinusoidal waves. The maximum level is applied during two consecutive microsteps to one of the phases of the motor, while the level of the other phase changes sign. During a motor stopping command, second pulses (VCA,VCB) are applied to the registers and to the two phases of the motor and are programmed so as to ensure, during the last microstep, an exact stopping position, such that all the stopping positions are kept apart by a whole number of half steps. Very precise, fast and noise-free printing is thus attained. The resolution is doubled, without any loss of precision or speed.

12 Claims, 5 Drawing Sheets

TABLE 1A

| 1a | 1b | 1c | 1d | 2a | 2b | 2c | 2d | 2e | 3a | 3b | 3c | 3d | 3e | 3f | 3g | 4a | 4b | 4c | 4d | 4e | 4f | 4g | 4h |
|---|---|---|---|---|---|---|---|---|---|---|---|---|---|---|---|---|---|---|---|---|---|---|---|
| step | ° | sin | cos | A | B | pos. | displ. | error | A | B | pos. | norm. pos. | displ. | error | norm. error | VCA | VCB | pos. | norm. pos. | displ. 1/2 | displ. 1/4 | error 1/2 | norm. error 1/2 |
| 0,00 | 0,0 | 0,00 | 1,00 | 0,00 | 1,00 | 0,00 | | 0% | 0,20 | 0,98 | 0,17 | 0,00 | 0,23 | -33,2% | 0,0% | 0,00 | 1,00 | 0,00 | 0,00 | -0,60 | -0,40 | 0,0% | 0,0% |
| 0,25 | 22,5 | 0,38 | 0,92 | 0,38 | 0,92 | 0,29 | 0,29 | | 0,56 | 0,83 | 0,40 | 0,23 | 0,20 | | 13,3% | | | | | | | -33,3% | -33,3% |
| 0,50 | 45,0 | 0,71 | 0,71 | 0,71 | 0,71 | 0,50 | 0,21 | 0% | 0,83 | 0,56 | 0,60 | 0,43 | 0,23 | -19,9% | 0,0% | 0,67 | 0,33 | 0,67 | 0,67 | -0,50 | -0,17 | -33,3% | -33,3% |
| 0,75 | 67,5 | 0,92 | 0,38 | 0,92 | 0,38 | 0,71 | 0,21 | | 0,98 | 0,20 | 0,83 | 0,67 | 0,33 | | 13,3% | | | | | | | 0,0% | 0,0% |
| 1,00 | 90,0 | 1,00 | 0,00 | 1,00 | 0,00 | 1,00 | 0,29 | 0% | 0,98 | -0,20 | 1,17 | 1,00 | 0,23 | -33,2% | 0,0% | 1,00 | 0,00 | 1,00 | 1,00 | -0,60 | -0,40 | -33,3% | -33,3% |
| 1,25 | 112,5 | 0,92 | -0,38 | 0,92 | -0,38 | 1,29 | 0,29 | | 0,83 | -0,56 | 1,40 | 1,23 | 0,20 | | 13,3% | | | | | | | 0,0% | 0,0% |
| 1,50 | 135,0 | 0,71 | -0,71 | 0,71 | -0,71 | 1,50 | 0,21 | 0% | 0,56 | -0,83 | 1,60 | 1,43 | 0,23 | -19,9% | 0,0% | 0,33 | -0,67 | 1,67 | 1,67 | -0,50 | -0,17 | -33,3% | -33,3% |
| 1,75 | 157,5 | 0,38 | -0,92 | 0,38 | -0,92 | 1,71 | 0,21 | | 0,20 | -0,98 | 1,83 | 1,67 | 0,33 | | 13,3% | | | | | | | 0,0% | 0,0% |
| 2,00 | 180,0 | 0,00 | -1,00 | 0,00 | -1,00 | 2,00 | 0,29 | 0% | -0,20 | -0,98 | 2,17 | 2,00 | 0,23 | -33,2% | 0,0% | 0,00 | -1,00 | 2,00 | 2,00 | -0,60 | -0,40 | -33,3% | -33,3% |
| 2,25 | 202,5 | -0,38 | -0,92 | -0,38 | -0,92 | 2,29 | 0,29 | | -0,56 | -0,83 | 2,40 | 2,23 | 0,20 | | 13,3% | | | | | | | 0,0% | 0,0% |
| 2,50 | 225,0 | -0,71 | -0,71 | -0,71 | -0,71 | 2,50 | 0,21 | 0% | -0,83 | -0,56 | 2,60 | 2,43 | 0,23 | -19,9% | 0,0% | -0,67 | -0,33 | 2,67 | 2,67 | -0,50 | -0,17 | -33,3% | -33,3% |
| 2,75 | 247,5 | -0,92 | -0,38 | -0,92 | -0,38 | 2,71 | 0,21 | | -0,98 | -0,20 | 2,83 | 2,67 | 0,33 | | 13,3% | | | | | | | 0,0% | 0,0% |
| 3,00 | 270,0 | -1,00 | 0,00 | -1,00 | 0,00 | 3,00 | 0,29 | 0% | -0,98 | 0,20 | 3,17 | 3,00 | 0,23 | -33,2% | 0,0% | -1,00 | 0,00 | 3,00 | 3,00 | -0,60 | -0,40 | -33,3% | -33,3% |
| 3,25 | 292,5 | -0,92 | 0,38 | -0,92 | 0,38 | 3,29 | 0,29 | | -0,83 | 0,56 | 3,40 | 3,23 | 0,20 | | 13,3% | | | | | | | 0,0% | 0,0% |
| 3,50 | 315,0 | -0,71 | 0,71 | -0,71 | 0,71 | 3,50 | 0,21 | 0% | -0,56 | 0,83 | 3,60 | 3,43 | 0,23 | -19,9% | 0,0% | -0,33 | 0,67 | 3,67 | 3,67 | -0,50 | -0,17 | -33,3% | -33,3% |
| 3,75 | 337,5 | -0,38 | 0,92 | -0,38 | 0,92 | 3,71 | 0,21 | | -0,20 | 0,98 | 3,83 | 3,67 | 0,33 | | 13,3% | | | | | | | 0,0% | 0,0% |
| 4,00 | 360,0 | 0,00 | 1,00 | 0,00 | 1,00 | 4,00 | 0,29 | 0% | 0,20 | 0,98 | 4,17 | 4,00 | 0,23 | -33,2% | 0,0% | 0,00 | 1,00 | 4,00 | 4,00 | -0,60 | -0,40 | -33,3% | -33,3% |
| 4,25 | 382,5 | 0,38 | 0,92 | 0,38 | 0,92 | 4,29 | 0,29 | | 0,56 | 0,83 | 4,40 | 4,23 | 0,20 | | 13,3% | | | | | | | 0,0% | 0,0% |
| 4,50 | 405,0 | 0,71 | 0,71 | 0,71 | 0,71 | 4,50 | 0,21 | 0% | 0,83 | 0,56 | 4,60 | 4,43 | 0,23 | -19,9% | 0,0% | 0,67 | 0,33 | 4,67 | 4,67 | -0,50 | -0,17 | -33,3% | -33,3% |
| 4,75 | 427,5 | 0,92 | 0,38 | 0,92 | 0,38 | 4,71 | 0,21 | | 0,98 | 0,20 | 4,83 | 4,67 | 0,33 | | 13,3% | | | | | | | 0,0% | 0,0% |
| 5,00 | 450,0 | 1,00 | 0,00 | 1,00 | 0,00 | 5,00 | 0,29 | 0% | 0,98 | -0,20 | 5,17 | 5,00 | 0,33 | -33,2% | 0,0% | 1,00 | 0,00 | 5,00 | 5,00 | | | 0,0% | 0,0% |

FIG. 5A

TABLE 1B

| 1a step | 1b ∡° | 1c sin | 1d cos | 2a A | 2b B | 2c pos. | 2d displ. | 2e error | 3a A | 3b B | 3c pos. | 3d norm. pos. | 3e displ. | 3f error | 3g norm. error | 4a VCA | 4b VCB | 4c pos. | 4d norm. pos. | 4e displ. 1/2 | 4f displ. 1/4 | 4g error 1/2 | 4h norm. error 1/2 |
|---|---|---|---|---|---|---|---|---|---|---|---|---|---|---|---|---|---|---|---|---|---|---|---|
| 0,00 | 0,0 | 0,00 | 1,00 | 0,00 | 1,00 | 0,00 | | 0% | 0,20 | 0,98 | 0,17 | 0,00 | | 33,2% | 0,0% | 0,23 | 0,77 | 0,23 | 0,00 | | | | 0,0% |
| 0,25 | 22,5 | 0,38 | 0,92 | 0,38 | 0,92 | 0,29 | 0,29 | | 0,56 | 0,83 | 0,40 | 0,23 | 0,23 | 19,9% | -13,3% | 0,57 | 0,43 | 0,57 | 0,34 | 0,40 | | 46,0% | -32,0% |
| 0,50 | 45,0 | 0,71 | 0,71 | 0,71 | 0,71 | 0,50 | 0,21 | 0% | 0,83 | 0,56 | 0,60 | 0,43 | 0,20 | 33,2% | 0,0% | 0,77 | -0,23 | 1,23 | 1,00 | 0,63 | 0,17 | 14,0% | 0,0% |
| 0,75 | 67,5 | 0,92 | 0,38 | 0,92 | 0,38 | 0,71 | 0,21 | | 0,98 | 0,20 | 0,83 | 0,67 | 0,23 | 19,9% | -13,3% | 0,43 | -0,57 | 1,57 | 1,34 | 0,40 | 0,40 | 46,0% | -32,0% |
| 1,00 | 90,0 | 1,00 | 0,00 | 1,00 | 0,00 | 1,00 | 0,29 | 0% | 0,98 | -0,20 | 1,17 | 1,00 | 0,33 | 33,2% | 0,0% | -0,23 | -0,77 | 2,23 | 2,00 | 0,63 | 0,17 | 14,0% | 0,0% |
| 1,25 | 112,5 | 0,92 | -0,38 | 0,92 | -0,38 | 1,29 | 0,29 | | 0,83 | -0,56 | 1,40 | 1,23 | 0,23 | 19,9% | -13,3% | -0,57 | -0,43 | 2,57 | 2,34 | 0,40 | 0,40 | 46,0% | -32,0% |
| 1,50 | 135,0 | 0,71 | -0,71 | 0,71 | -0,71 | 1,50 | 0,21 | 0% | 0,56 | -0,83 | 1,60 | 1,43 | 0,20 | 33,2% | 0,0% | -0,77 | 0,23 | 3,23 | 3,00 | 0,63 | 0,17 | 14,0% | 0,0% |
| 1,75 | 157,5 | 0,38 | -0,92 | 0,38 | -0,92 | 1,71 | 0,21 | | 0,20 | -0,98 | 1,83 | 1,67 | 0,23 | 19,9% | -13,3% | -0,43 | 0,57 | 3,57 | 3,34 | 0,40 | 0,40 | 46,0% | -32,0% |
| 2,00 | 180,0 | 0,00 | -1,00 | 0,00 | -1,00 | 2,00 | 0,29 | 0% | -0,20 | -0,98 | 2,17 | 2,00 | 0,33 | 33,2% | 0,0% | 0,23 | 0,77 | 4,23 | 4,00 | 0,63 | 0,17 | 14,0% | 0,0% |
| 2,25 | 202,5 | -0,38 | -0,92 | -0,38 | -0,92 | 2,29 | 0,29 | | -0,56 | -0,83 | 2,40 | 2,23 | 0,23 | 19,9% | -13,3% | 0,57 | 0,43 | 4,57 | 4,34 | 0,40 | 0,40 | 46,0% | -32,0% |
| 2,50 | 225,0 | -0,71 | -0,71 | -0,71 | -0,71 | 2,50 | 0,21 | 0% | -0,83 | -0,56 | 2,60 | 2,43 | 0,20 | 33,2% | 0,0% | 0,77 | -0,23 | 5,23 | 5,00 | 0,63 | 0,17 | 14,0% | 0,0% |
| 2,75 | 247,5 | -0,92 | -0,38 | -0,92 | -0,38 | 2,71 | 0,21 | | -0,98 | -0,20 | 2,83 | 2,67 | 0,23 | 19,9% | -13,3% | | | | | | | | |
| 3,00 | 270,0 | -1,00 | 0,00 | -1,00 | 0,00 | 3,00 | 0,29 | 0% | -0,98 | 0,20 | 3,17 | 3,00 | 0,33 | 33,2% | 0,0% | | | | | | | | |
| 3,25 | 292,5 | -0,92 | 0,38 | -0,92 | 0,38 | 3,29 | 0,29 | | -0,83 | 0,56 | 3,40 | 3,23 | 0,23 | 19,9% | -13,3% | | | | | | | | |
| 3,50 | 315,0 | -0,71 | 0,71 | -0,71 | 0,71 | 3,50 | 0,21 | 0% | -0,56 | 0,83 | 3,60 | 3,43 | 0,20 | 33,2% | 0,0% | | | | | | | | |
| 3,75 | 337,5 | -0,38 | 0,92 | -0,38 | 0,92 | 3,71 | 0,21 | | -0,20 | 0,98 | 3,83 | 3,67 | 0,23 | 19,9% | -13,3% | | | | | | | | |
| 4,00 | 360,0 | 0,00 | 1,00 | 0,00 | 1,00 | 4,00 | 0,29 | 0% | 0,20 | 0,98 | 4,17 | 4,00 | 0,33 | 33,2% | 0,0% | | | | | | | | |
| 4,25 | 382,5 | 0,38 | 0,92 | 0,38 | 0,92 | 4,29 | 0,29 | | 0,56 | 0,83 | 4,40 | 4,23 | 0,23 | 19,9% | -13,3% | | | | | | | | |
| 4,50 | 405,0 | 0,71 | 0,71 | 0,71 | 0,71 | 4,50 | 0,21 | 0% | 0,83 | 0,56 | 4,60 | 4,43 | 0,20 | 33,2% | 0,0% | | | | | | | | |
| 4,75 | 427,5 | 0,92 | 0,38 | 0,92 | 0,38 | 4,71 | 0,21 | | 0,98 | 0,20 | 4,83 | 4,67 | 0,23 | 19,9% | -13,3% | | | | | | | | |
| 5,00 | 450,0 | 1,00 | 0,00 | 1,00 | 0,00 | 5,00 | 0,29 | 0% | 0,98 | -0,20 | 5,17 | 5,00 | 0,33 | 33,2% | 0,0% | | | | | | | | |

FIG. 5B

METHOD AND APPARATUS FOR DRIVING A STEPPING MOTOR USING DIGITAL PULSE TRAINS SIMULATING SINE AND COSINE WAVES

TEXT OF THE DESCRIPTION

This invention relates to a method for driving a stepping motor for printers comprising the generation of digital pulse trains consisting of first pulses representing a sine wave simulation, the said first pulses being applied to the phases of the motor to command rotation of the latter.

It also relates to a device for implementation of the method.

In the field of serial printing matrix printers, a matrix printhead is moved in a backward-and-forward movement transversally to the direction of feed of the paper in order to print the dots constituting the image to be printed.

Feeding of the paper between passages of the head and also movement of the carriage bearing the printhead are often achieved by stepping motors. It has been observed that, when using stepping motors, though the stopping positions on a full step are generally relatively precise and easily reproducible, the stop on a half step does not correspond exactly to the theoretical position of the poles of the motor or a position half way between them for the half step. Consequently printing is irregular, for example the spacing between the horizontal lines appears alternately wider and narrower.

This invention is intended to remedy these defects and as such is characterized by the fact that, during a motor stop command at a minimum during the last motor displacement leading to the stopping position on an even and/or odd number of motor half steps, second pulses are sent having a value that is programmed to ensure an exact stopping position, such that all the stopping positions are separated from each other by a whole number of half steps.

With these characteristics, printing is obtained that is very exact with extremely regular vertical and/or horizontal spacing corresponding exactly to the desired position.

The invention also enables the printing resolution to be doubled without any loss of precision or speed.

To advantage, values are recorded in a set of registers or programmable memories that correspond, for the first pulses, to the values of one quarter of a sinusoidal period and, for the second pulses, to the stop on an even or odd half step.

This permits simple stopping correction to be made, in relation to the type of printer and the machine used, as well as rapid command of movement and stops on an even and/or odd half step. The use of registers means that amplitude of the pulse trains can be modulated easily.

In a preferred embodiment, two trains of first pulses one quarter of a period apart are used and applied to two phases of a stepping motor, the values of these first pulses being divided into n levels for one quarter of a sinusoidal period corresponding to one motor step, these values of first pulses being addressed in a set of n programmable registers for motor drive operation of n microsteps per quarter period, where n is an even whole number, and driving of the motor is achieved in such a way that the maximum level is applied during two consecutive microsteps to one of the motor phases, while level of the other phase changes sign between the two consecutive microsteps.

With these characteristics, easy, fast and precise drive operation is obtained at a low cost price. A single set of n registers is sufficient to generate all the pulse train levels for the two motor phases. Modification of the pulse levels to perform stopping step correction is made possible for either phase A and B of the motor, given that at no time are the same registers used simultaneously.

Advantageously the values of the second pulses are adjusted by observing and/or measuring printed tests and by changing the values so that all the stopping positions are regularly spaced apart by a whole number of half steps.

Precision adjustment of the printer may thus be performed very easily in the factory and also by the user, who may make corrections following lapses of adjustment caused during shipping, etc.

The invention also concerns apparatus for implementation of the method and as such is characterized by the fact that the apparatus comprises an electronic control unit possessing driving members arranged to supply to registers values of first pulses representing a sinusoidal wave simulation and, during a stopping command at a minimum during the last movement of the motor leading to the stopping position on an odd and/or even number of motor half steps, second pulses the values of which are programmed so as to ensure an exact stopping position such that all the stopping positions are spaced apart by a whole number of half steps, the said registers being linked to actuating means of the motor.

These characteristics permit precise, rapid printer drive operation to be achieved, at a moderate cost price, with simple, uncomplicated printing adjustment.

To advantage, the actuating means comprise, for each of the two phases of the stepping motor, a variable pulse length modulator the signals of which are converted into reference voltages applied to a H-shape amplifier working on the chopper principle of a motor phase, the driving members being so arranged as to supply the H-shape amplifier the information about polarity of the said first or second pulses.

The stepping motor driving obtained is thus particularly practical and reliable.

As a general rule, digital driving permits the command pulse levels on the phases of the motor to be easily adapted in order to bring the rotor to a defined position. The pseudo-sinusoidal drive operation claimed grants high speed movement for a given number of poles. Precision of the stopping position on steps and half steps makes it possible to double resolution without any reduction in displacement speed. Pseudo-sinusoidal driving also permits relatively noise-free rotation. Digital driving is accompanied by reduced power absorption levels.

Other advantages will be apparent from the features described in the associated claims and from the description relating the invention in greater detail, in conjunction with the drawings schematically depicting by way of example one embodiment with variants thereof.

The tables IA and IB in FIGS. 5A and 5B illustrate the numerical values for the quarter step commands in a first and second direction respectively.

Use of the sine-cosine as the drive operation waveform is very appropriate for the dynamic type stepping motors working with choppers, as compared with the traditional method of driving by full steps and half steps. It grants harmonious, noise-free rotation.

Though their positioning precision is acceptable when stopping on a full step (that is to say, with two motor phases energized), inexpensive stepping motors experience problems when stopping on the half step (one motor phase energized).

The sine-cosine waveforms may be generated by an approach based on microstep drive operation called "microstepping". Driving of this type may be achieved with varyingly narrow microsteps, such as driving in half steps, quarter steps or eighths of a step, etc., corresponding to a varyingly fine digital simulation of a sinusoid wave.

Figure 1:
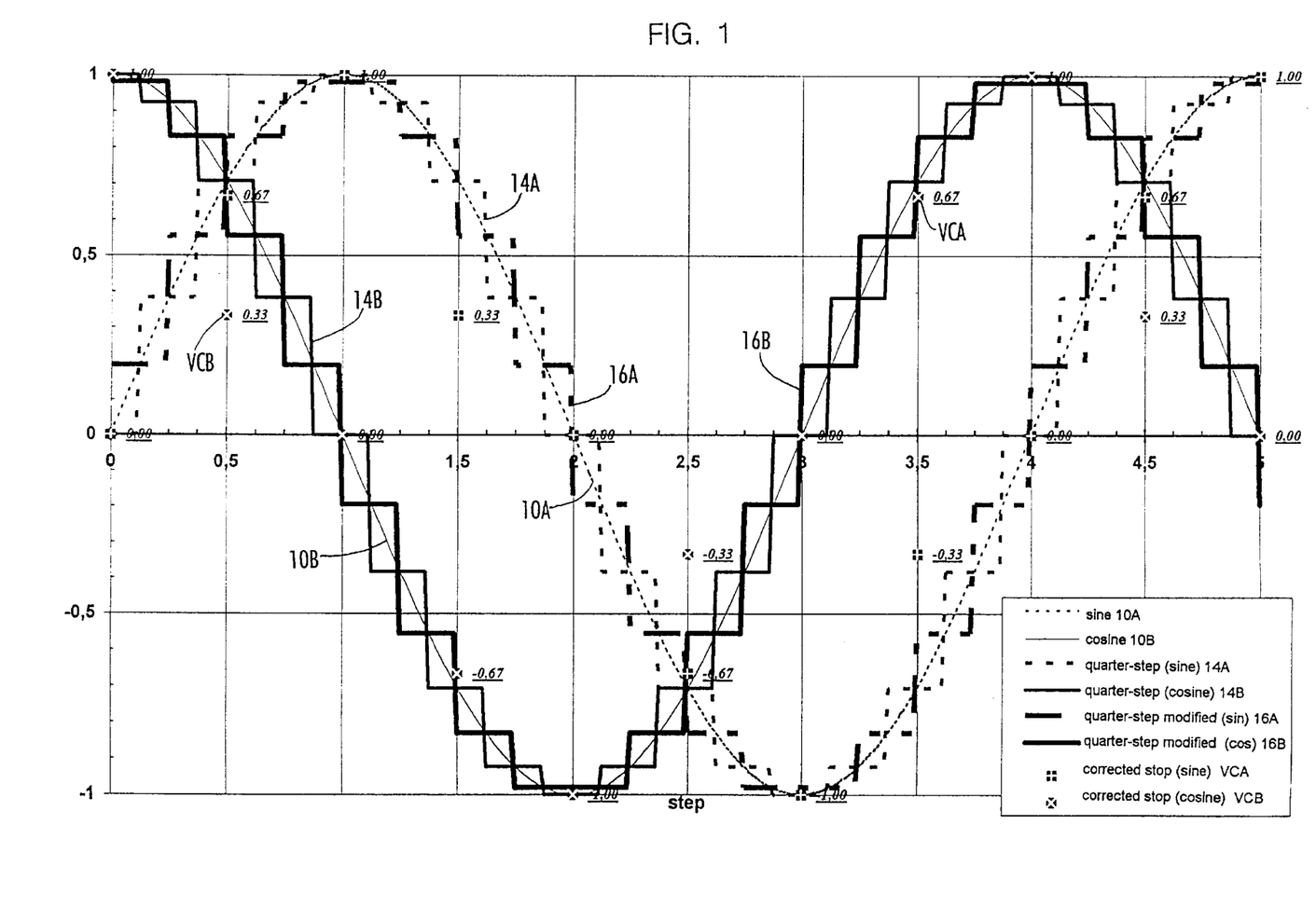
FIGS. 1 and 2 represent the pulse trains for quarter step and half step drive operation.
Figure 2:
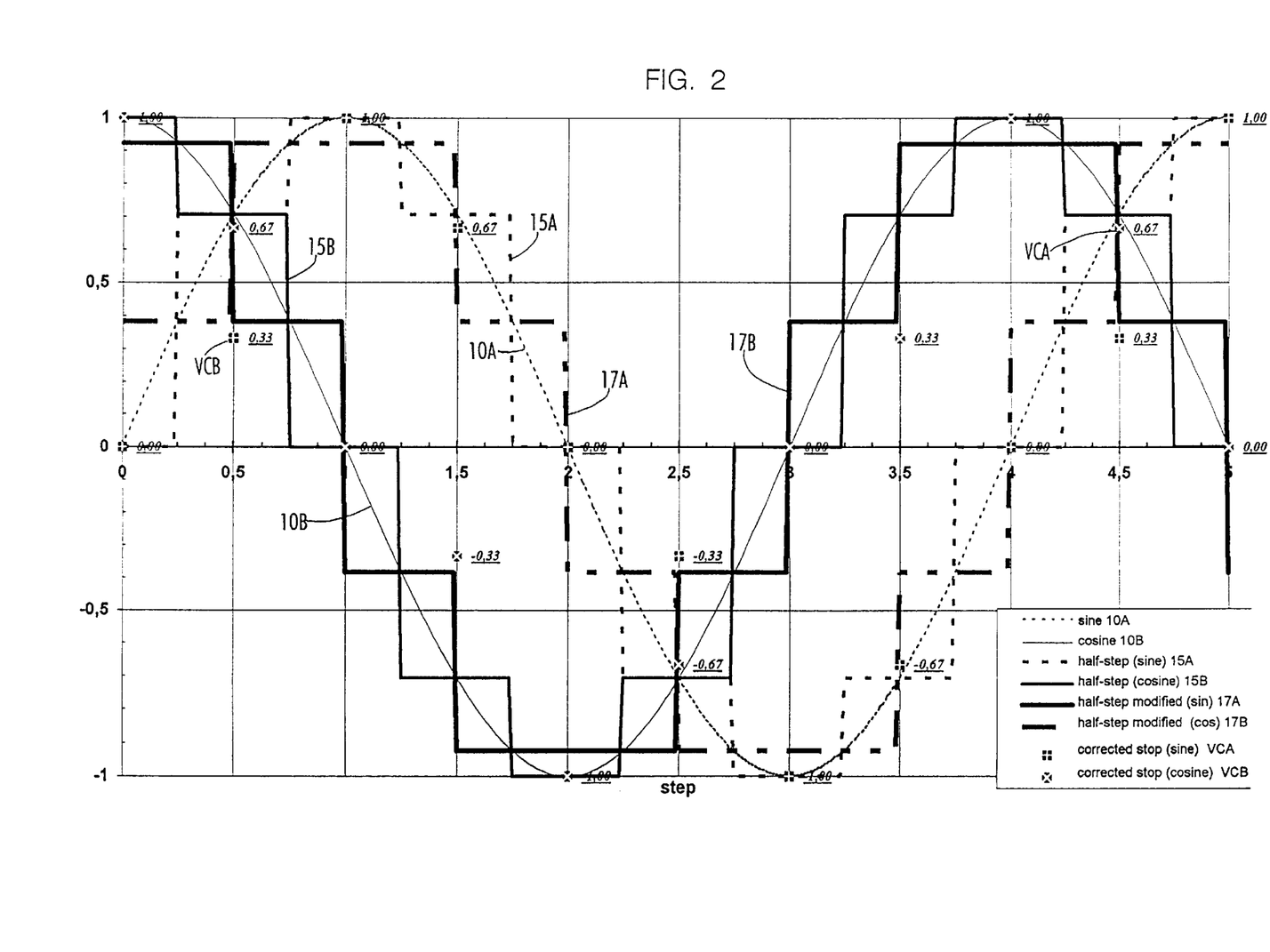

FIGS. 1 and 2 respectively illustrate the sine and cosine waves 10A, 10B upon which the driving is based. The curves or pulse trains 14A, 14B and 15A,15B correspond to a known digital simulation approach. The curves 14A and 14B represent the quarter step approach, dividing a motor step corresponding to an angle of 90° into four microsteps, and curves 15A and 15B of FIG. 2 the half step approach dividing a motor step of 90° into two half steps.

It can be seen from these two figures that, in order to cover the surface area of the sine or cosine, an offset along the x-axis of one half of a microstep is applied for calculation of the voltage or current signal levels.

To be able to work with variable peak signal levels, programmable registers are used and the different levels used in a quarter of a period of the sinusoid wave are stored therein.

The known quarter step approach generally makes use of five registers and five voltage or current levels as may be seen in FIG. 1, with reference to the curves 14A, 14B. The levels contained in the five registers R0 to R4 have the following values:

R0=0

R1=±0.38

R2=±0.71

R3=±0.92

R4=±1.00

A step sequencer or a similar driving program allows contents of the registers to be addressed on receiving the commands of the motor phases A and B depending on position of the rotor of the motor and more specifically in the following way:

It will be observed that, for the microsteps ½, 1 ½, 2 ½ and 3 ½, the same register R2 is used for both motor phases.

In the solution according to the present invention, the quarter step approach is modified in novel fashion by using only four levels addressed in four registers.

To make up for the lack of register R0 containing the 0 level, the step sequencer is designed to stay on the maximum level twice in succession, whereas the level in the other phase of the motor changes sign as can be seen in FIG. 1 with reference to the curves 16A, 16B. The levels in the registers R1 to R4 have the following values:

R1=±0.20

R2=±0.56

R3=±0.83

R4=±0.98

The step sequencer or driving program thus addresses the contents of the registers in the following way on receipt of the commands of the motor phases A and B:

| Position (microstep) | 0 | ¼ | ½ | ¾ | 1 | 1¼ | 1½ | 1¾ | 2 | 2¼ ... |
|---|---|---|---|---|---|---|---|---|---|---|
| motor phase A | +R1 | +R2 | +R3 | +R4 | +R4 | +R3 | +R2 | +R1 | −R1 | −R2 |
| motor phase B | +R4 | +R3 | +R2 | +R1 | −R1 | −R2 | −R3 | −R4 | −R4 | −R3 |

It may be seen that, in this method of generating a digital simulation of the sine-cosine slopes or pulse trains, at no time is the same register used for both phases of the motor.

This method of generating the levels of the sine-cosine slopes or pulse trains provides the following advantages:

The use of registers means that amplitude of the sine-cosine wave can be modulated.

A single set of registers is sufficient to generate all the levels of the sine and cosine pulse trains for both phases of the motor.

Modification of the levels of the voltage or current pulses to perform stopping step correction is made possible for both motor phases A and B given that, at no time, are the same registers used simultaneously.

With reference to FIG. 2, the known half step digital simulation approach uses three registers and three voltage levels (curves 15A, 15B). The levels contained in the registers R0 to R2 have the following values:

R0=0

R1=±0.71

R2=±1.00

The step sequencer or driving program addresses the contents of the registers in the following way on receiving the commands of the motor phases A and B.

| Position (microstep) | 0 | ¼ | ½ | ¾ | 1 | 1¼ | 1½ | 1¾ | 2 | 2¼ ... |
|---|---|---|---|---|---|---|---|---|---|---|
| motor phase A | R0 | +R1 | +R2 | +R3 | +R4 | +R3 | +R2 | +R1 | R0 | −R1 |
| motor phase B | +R4 | +R3 | +R2 | +R1 | R0 | −R1 | −R2 | −R3 | −R4 | −R3 |

| position (microstep) | 0 | ½ | 1 | 1½ | 2 ... |
|---|---|---|---|---|---|
| motor phase A | R0 | +R1 | +R2 | +R1 | R0 ... |
| motor phase B | +R2 | +R1 | R0 | −R1 | −R2 ... |

For the microsteps ½, 1 ½, 2 ½, et 3 ½, the register R1 is thus used simultaneously for the two phases of the motor.

In the solution according to the present invention, the half step approach is modified by using only two signal levels contained in two registers, instead of three levels and three registers. To make up for the lack of register R0, the step sequencer has been designed to stop twice in succession on the maximum value, whereas the level in the other phase of the motor changes sign, as may be seen in FIG. 2 with reference to the curves or pulse trains 17A, 17B.

The levels contained in the two registers R1 and R2 have the values ±0.38 and ±0.92.

Contents of the registers, in accordance with the present invention, are thus addressed in the following way on receipt of the commands of motor phases A and B:

| Position (microstep) | 0 | ½ | 1 | 1½ | 2 ... |
|---|---|---|---|---|---|
| motor phase A | +R1 | +R2 | +R2 | +R1 | −R1 ... |
| motor phase B | +R2 | +R1 | −R1 | −R2 | −R2 ... |

At no time is the same register used for both phases of the motor.

Similar remarks may be made for sine-cosine simulation drive operation in eighths of a step, wherein the conventional approach uses 9 different levels, whilst the approach according to the present invention uses 8 different levels contained in a single set of 8 registers, no register being used simultaneously for the two motor phases.

Generally speaking, according to the present invention, the signal levels applied to the two windings or phases A and B of the stepping motor are divided into n levels contained in a single set of n registers for motor driving in n microsteps per motor step of 90°, n being an even whole number.

Moreover, driving is effected in such a way that the maximum level is applied during two consecutive microsteps to one of the phases, while the level in the other phase changes sign between the two consecutive microsteps.

The modified quarter step driving according to the present invention produces a positioning that is slightly offset (19.9%) for the stop on a full step, corresponding to an odd half step, with respect to the stopping position with both phases energized in balanced fashion by the same currents. The stop on an even half step is slightly erroneous; the rotor of the motor stops theoretically with an error of −13.3% with respect to the stopping position on an odd half step.

This error of modified quarter step drive operation may be compensated for by correction of the voltage or current levels at the stop, but this is not however sufficient to permit precise half step positioning and is a defect of inexpensive stepping motors due to their construction. Positioning precision of a motor on the full step is generally good with errors of between 2 and 7%.

On the other hand, during the stop on the half step, precision is bad. Typically errors of between 10 and 30% are found.

Differences in positioning precision on stopping have also been found between motors made by different manufacturers or of different types.

To remedy these defects, the levels of the voltage or current signals contained in the registers are corrected so that the theoretical stop on the odd half step (=motor position with two phases energized, called full step) is no longer made on a multiple of the half step, but of a value that is 33% less far away than the even half step (=motor position with one phase energized).

Table IA (FIG. 5A) summarizes the different numerical values regarding the quarter step driving illustrated in FIG. 1 for a first direction of orientation corresponding to decreasing steps.

Column 1a indicates the value of the microsteps and columns 1b, 1c and 1d contain the corresponding angle, sine and cosine values.

Columns 2a to 2e refer to the curves or pulse trains 14A, 14B for the conventional, 5-level digital simulation. Columns 2a and 2b indicate values of the levels for the simulation curves 14A (phase A) and 14B (phase B).

Column 2c indicates the calculated position of the motor rotor.

Column 2d indicates the displacement during the last quarter step and column 2e the theoretical position error.

Columns 3a to 3g indicate the values with reference to the curves 16A, 16B for the 4-level digital simulation in accordance with the present invention, where columns 3a and 3b contain values of the levels for the simulation curves 16A (phase A) and 16B (phase B), columns 3c and 3d the calculated positions of the rotor, non-normalized and normalized by displacement of the origin of the x-axis, column 3e the displacement values during the last quarter step, and columns 3f and 3g the values of the error of the non-normalized and normalized theoretical positions obtained in relation to the nearest half step.

Columns 4a to 4h concern the corrected stopping positions where columns 4a and 4b contain the values of the stopping levels VCA and VCB for phase A and for phase B, columns 4c and 4d the non-normalized and normalized position values calculated, columns 4e and 4f the values of the displacements during the last half step and the last quarter step, and columns 4g and 4h the non-normalized (4g) and normalized (4h) theoretical position error values in relation to the closest half step.

For the stopping positions, the signal levels applied to the phases of the motor are corrected solely in the last microstep, that is to say one quarter step before the stopping position, the levels applied being 0.00 et ±1.00 for the even half steps and ±0.67 and ±0.33 for the odd half steps.

If the displacement is observed dynamically during the approach to the stopping position, it will be seen that for the stop on an odd half step (=full step), the theoretical displacement is of exactly −0.5 steps, in relation to the last half step, and of −0.17 steps (−33%) in relation to the last quarter step. The approach to the even half step is made by a displacement of −0.6 steps (+20%) in relation to the last half step and of −0.4 steps (+60%) in relation to the last quarter step.

With these corrections, representing a theoretical offset of 33% between odd half steps (=full step) and even half steps, precise stopping is obtained for the even and odd half steps. It is also possible to adjust exactly value of the levels for the stopping positions for each type of motor or even for each motor individually.

This method of correcting stopping positions can also be applied for displacement in the opposite direction, adaptation of the current levels being chosen to achieve the same position corrections (33%) and to reach these positions with the same movements.

Table IB (FIG. 5B) lists the corresponding values for rotation in a second direction, opposite the first, in increasing steps from right to left in FIG. 1. Columns 1a to 4h correspond to those of table IA. It will be seen that the values in the columns 4a to 4g referring to the corrected stopping positions are very different from those shown for the first direction of rotation (FIG. 4A). Values of the corrected levels VCA and VCB in this case are ±0.23 and ±0.77 for the even half step stops and ±0.57 and ±0.43 for the odd half step stops.

Similarly, application of position corrections is possible, for all other sine-cosine drive operation approaches and for all half step, eighth of a step, etc. microsteps. FIG. 2 shows values of the corrected levels VCA, VCB for the even and odd half step stops, which are also 0 and ±1.00, and ±0.67 and ±0.33 respectively.

Since there are only two registers available for this half step drive operation, the driving program must also be designed to define at any time whether the stopping half step is even or odd and to apply the corresponding correction values VCA et VCB, that is to say 0 and ±1.00 for a stop on an even half step, and ±0.67 and ±0.33 for a stop on an odd half step, for rotation of the motor in a first direction.

Generally speaking, it is possible to print a test pattern of lines and/or columns, to observe or measure by all optical or other means this printed test pattern and to modify the VCA and VCB levels for the stops so that all the stop positions are regularly spaced apart by a whole number of half steps. This adjustment work may be carried out either in the factory or by the user.

Figure 3:
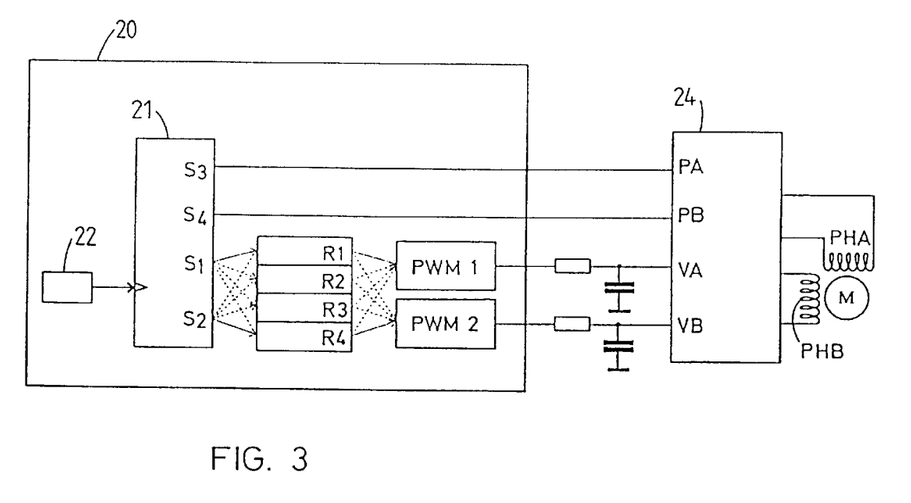
FIG. 3 is a block diagram of apparatus for implementation of the method of driving.

FIG. 3 represents apparatus for the implementation of the above-described method. An electronic control unit 20, in the form of a microprocessor for example, comprises a step sequencer 21 governed by a clock 22. Naturally the function of the step sequencer could also be carried out by an appropriate driving program.

This step sequencer supplies on its outputs S1 and S2 the values of the levels of the four registers R1,R2,R3 and R4. It ensures that the motor is made turn by the consecutive addressing of the registers. The values of the registers are converted in the two modulators PWM1 and PWM2 into variable pulse length signals, in turn converted into reference voltages VA and VB. The polarities PA and PB of the reference voltages are also supplied by the step sequencer 21, on outputs S3 and S4. The reference voltages VA and VB are then processed in an amplifier 24 controlling the operation of each phase PHA and PHB of the motor M in accordance with the method described above.

Figure 4:
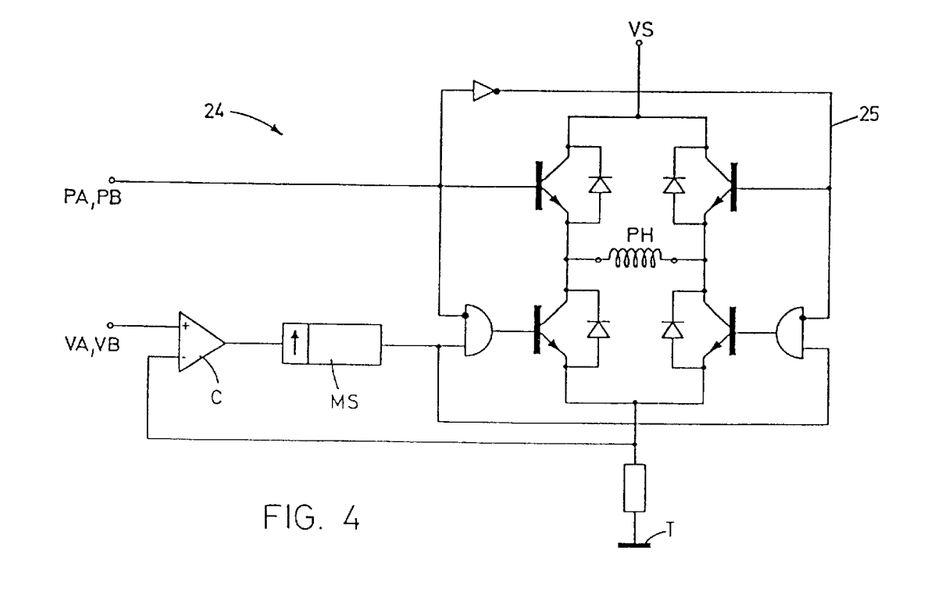
FIG. 4 is an electric circuit of one detail of the block diagram of FIG. 3.

FIG. 4 illustrates the electrical diagram of the amplifier, which in actual fact comprises a H-shape amplifier circuit 25 for each phase PH or each winding of the motor M. This H-shape amplifier circuit 25 is based on the chopper principle of a motor phase. The input signal VA or VB is provided to a comparator C, the output whereof is connected to the lower leg of the amplifier circuit 25 by means of a monostable element MS. Information about the polarity PA or PB is fed to the upper leg of the circuit 25, which also comprises a power supply VS and an earth path T. Operation of this type of amplifier circuit 25 is well-known to those familiar with the sector art and is not described herein.

It is clear that the embodiments described in the foregoing possess no limiting traits and that all the changes desired may be made to the interior of the frame as defined in claim 1. In particular, the method could be applied to other types of microstepping drive operation having another number of pulse trains, and therefore another number of motor phases, or comprising another number of microsteps per motor step. The values of the first pulses could equally be different.

The values of the levels stored in the registers could also be calculated in real time or supplied by a computer program and be input directly to the PWM modulators. The drive apparatus could comprise an electronic control unit operating on a principle other than that of the PWM mode. The reference voltages could be generated by means of digital/analogue converters rather than by the PWM modulators. Similarly, the motor driver amplifier could be of another type.

What we claim is:

1. A method for driving a stepping motor for printers comprising the phases of:

defining an even number n of microsteps to be generated within a quarter of a full step;

storing n sine values, each corresponding to one microstep of said even number n of microsteps;

generating a digital pulse train made up of n first A-pulses having amplitudes proportional to said n sine values, in such an order to simulate a sine wave, said n first A-pulses being applied to a phase A of the stepping motor;

generating a digital pulse train made up of n first B-pulses having amplitudes proportional to said n sine values, in such an order to simulate a cosine wave, said n first B-pulses being applied to a phase B of the stepping motor; and sending second pulses during at least the last displacement of the stepping motor prior to a stopping command, said second pulses having a value calculated on the basis of said n sine values and motor parameters, whereby the stopping positions of the stepping motor are separated from each other by a whole number of microsteps.

2. A method according to claim 1, further including the phase of selecting said n sine values in order to avoid the sine (45 degrees) value, whereby said amplitudes of said n first A-pulses are different from said amplitudes of said n first B-pulses for all said n microsteps.

3. A method according to claim 1, wherein said values for said first A-pulses, said values for said first B-pulses, and said values for said second pulses are stored in a set of registers or programmable memories.

4. A method according to claim 1, further including the phase of selecting said n sine values in order to drive the motor in such a way that a maximum value of said n sine values is applied, during two consecutive microsteps, to one of the phases of the motor, while another value of said n sine values, applied to the other phase of the motor, changes sign between said two consecutive microsteps.

5. A method according to claim 1, wherein the values of said second pulses are adjusted by measuring printed tests or rotor positions, and by modifying their values so that all the stopping positions are regularly spaced apart by a whole number of microsteps.

6. A method according to claim 5, wherein said tests are carried out for each type of motor or for each motor individually.

7. A method according to claim 1, wherein for a quarter step driving with n=4, the n levels recorded for said first pulses in the n registers have values ±0.20, ±0.56, ±0.83, ±0.98 and the second pulses have values ±0.67 and ±0.33 for the stops on an odd number of half steps and 0 and ±1 for the stops on an even number of half steps during the motor rotation in a first direction, and wherein said second pulses have values ±0.57 and ±0.43 for the stops on an odd number of half steps and ±0.23 and ±0.77 for the stops on an even number of half steps during the motor rotation in the direction opposite the first direction.

8. A method according to claim 1, wherein for a half step driving with n=2, the two levels recorded in the two registers for the two first pulses have values ±0.38 and ±0.92 and said second pulses have values ±0.67 and ±0.33 for the stops on an odd number of half steps and 0 and ±1 for the stops on an even number of half steps during motor rotation in a first direction.

9. Apparatus for driving a stepping motor comprising an electronic control unit having first memory means for storing n sine values, n being an even whole number;

second memory means for storing second pulses values;

driving means, connected to said first memory means and to said second memory means, for supplying on their outputs a first sequence of sine values in a first order to simulate a sine wave, hence generating n first A-pulses, and a second sequence of sine values in a second order to simulate a cosine wave, hence generating n first B-pulses, and for further supplying on their outputs said second pulses values during at least the last displacement of the stepping motor prior to a stopping command, whereby the stopping positions of the stepping motor are separated from each other by a whole number of microsteps.

10. Apparatus according to claim 9, further comprising a first digital to analog converter connected to said outputs of said driving means for converting said n first A-pulses or said second pulses values into reference voltages applied to a first H-shape amplifier to supply a stepper motor phase A; and a second digital to analog converter connected to said outputs of said driving means for converting said n first B-pulses or said second pulses into reference voltages applied to a second H-shape amplifier to supply a stepper motor phase B.

11. Apparatus according to claim 10, wherein said digital to analog converter comprises a variable pulse length modulator for said motor phase A and for said motor phase B, the signals whereof are converted into reference voltages applied to a H-shape amplifier based on the chopper principle of a motor phase.

12. Apparatus according to claim 9, wherein said control unit comprises a set of n registers for a drive operation comprising n microsteps per quarter of a sinusoidal period corresponding to one motor step, n being an even whole number, said control unit being programmed in such a manner that a maximum value of said n sine values is applied, during two consecutive microsteps, to one of the phases of the motor, while another value of said n sine values, applied to the other phase of the motor, changes sign between said two consecutive microsteps.

* * * * *